(12) United States Patent
Iwasaki et al.

(10) Patent No.: US 7,163,757 B2
(45) Date of Patent: Jan. 16, 2007

(54) SECONDARY BATTERIES HAVING A PROTECTIVE CIRCUIT

(75) Inventors: Norikazu Iwasaki, Kanuma (JP); Masami Kawazu, Kanuma (JP); Hisaya Tamura, Kanuma (JP); Kazutaka Furuta, Kanuma (JP)

(73) Assignees: Sony Corp., Tokyo (JP), part interest; Sony Chemical & Information Device Corporation, Tokyo (JP), part interest ( * ) Notice: Subject to any disclaimer, the term of this patent is extended or adjusted under 35 U.S.C. 154(b) by 393 days.

(21) Appl. No.: 10/262,232

(22) Filed: Oct. 1, 2002

(65) Prior Publication Data

US 2003/0064257 A1 Apr. 3, 2003

(30) Foreign Application Priority Data

Oct. 2, 2001 (JP) ............................. 2001-306048

(51) Int. Cl.
*H01M 10/50* (2006.01)
*H01M 10/48* (2006.01)

(52) U.S. Cl. .................. 429/7; 429/8; 429/62; 429/92; 429/121

(58) Field of Classification Search .................... 429/7, 429/8, 11, 62, 92, 121
See application file for complete search history.

(56) References Cited

U.S. PATENT DOCUMENTS 5,871,858 A * 2/1999 Thomsen et al. .............. 429/7

FOREIGN PATENT DOCUMENTS

| JP | 11-242966 | | 9/1999 |
|---|---|---|---|
| JP | 2001-126903 | | 5/2001 |
| JP | 2001126903 A | * | 5/2001 |
| JP | 2002-233048 | | 8/2002 |

OTHER PUBLICATIONS

Patent Abstracts of Japan, publication No. 2002-233048, publication date of Aug. 16, 2002 (2 pgs.).
English Abstract of JP-11-242966, Publication dated Sep. 7, 1999.
English Abstract of JP-2001-126903, Publication dated May 11, 2001.
Office Action Dated Sep. 7, 2004 with English Translation (3 pages).

* cited by examiner

*Primary Examiner*—Tracy Dove
(74) *Attorney, Agent, or Firm*—Osha Liang LLP

(57) ABSTRACT

A secondary battery with high safety is provided. A heater and a diode are connected in series, and a thermistor is connected in parallel with thus formed series circuit. A fuse is connected in series with thus formed parallel circuit to form a protective circuit, which is attached to an accumulator to complete a secondary battery. In the case of overcharging, the accumulator generates heat so that the thermistor heats up to increase the resistance value. As a result, the current pass through the heater, which generates heat to break the fuse. In the case of short circuit, the diode is reverse-biased and no current passes through the heater so that the fuse does not break.

3 Claims, 3 Drawing Sheets

SECONDARY BATTERIES HAVING A PROTECTIVE CIRCUIT

BACKGROUND OF INVENTION

The present invention relates to the field of rechargeable secondary batteries, particularly to secondary batteries including a protective circuit.

BACKGROUND ART

Secondary batteries including a protective circuit in addition to a chargeable/dischargeable accumulator are commonly used in cellular phones or portable personal computers. In general, it is important that secondary batteries used for these purposes not only have a high charging capacity but also provide a safe protective circuit. Reference 101 in FIG. 3 represents a prior art secondary battery comprising an accumulator 107 and a fuse 111.

One end of fuse 111 is connected to a terminal of accumulator 107 on the high voltage side and the other end of fuse 111 is connected to an external connection terminal 117 on the high voltage side. A terminal of accumulator 107 on the low voltage side is connected to an external connection terminal 118 on the low voltage side.

Reference 130 represents an external DC voltage source. When the external DC voltage source 130 is connected to external connection terminals 117, 118, the current supplied from external DC voltage source 130 passes through fuse 111 to charge accumulator 107.

If external connection terminals 117, 118 are short-circuited in such a secondary battery 101 or an external DC voltage source outputting a superspecified voltage is connected, a large current passes through fuse 111 so that fuse 111 breaks to protect accumulator 107, which otherwise would generally involve a safety problem when the accumulator in the secondary battery breaks.

However, fuse 111 must be changed if external connection terminals 117, 118 are short-circuited by accident in the production line or the like, because secondary battery 101 becomes unusable when fuse 111 breaks.

If protection is to be provided by a thermistor having a resistance value increasing with temperature rise in place of fuse 111, accumulator 107 disadvantageously continues to be charged even when the resistance value of the thermistor increases by overcharging because the thermistor cannot wholly open the circuit.

In recent years, lithium-ion batteries having a high energy density have become commonly used to extend the run time of electronic equipments such as portable computers, but lithium-ion batteries fall into a dangerous condition when they are overcharged.

In order to protect lithium-ion batteries against overcurrent or overcharging, IC/FET-based protective circuits are used and have the advantage that ICs and FETs need not be changed even in the case of short circuit in the production line because ICs and FETs can be reused.

However, ICs and FETs differ from fuses in that they become shorted to fail in protecting accumulators from being overcharged in the case of failure such as electrostatic breakage.

What is needed, therefore, is a highly safe secondary battery having a simple circuit.

SUMMARY OF INVENTION

In one aspect, the present invention provides a secondary battery comprising a rechargeable/redischargeable accumulator and a protective circuit connected to the accumulator wherein the charging/discharging current passes through the protective circuit to or from the accumulator. Further, the protective circuit comprises a heater generating heat by a current flowing, a diode connected in series with the heater and forward-biased when a charging current is supplied from an external DC voltage source to the accumulator, a thermistor connected in parallel with a series circuit comprising the heater and the diode and having a resistance value increasing with temperature rise, and a fuse connected in series with a parallel circuit comprising the series circuit and the thermistor.

In one embodiment, the protective circuit is attached to the accumulator and the thermistor is heated up by the accumulator heating up. In one embodiment, the fuse heats up to break by heat generated by the heater.

In one embodiment, a protective circuit is inserted between an external connection terminal to which a load is connected and an accumulator, and the charging/discharging current to or from the accumulator passes through the protective circuit.

When the accumulator is charged, the diode is forward-biased, but the charging current mainly passes through the thermistor because the resistance of the heater is higher than that of the thermistor at normal temperature. If the accumulator is overcharged, the accumulator heats up to heat the thermistor so that the resistance value of the thermistor increases beyond the resistance value of the heater.

In this state, the current mainly passes through the heater, which generates heat to break the fuse. If the secondary battery is short-circuited, the diode is reverse-biased and no current passes through the heater so that the fuse does not break.

DETAILED DESCRIPTION

Figure 1:
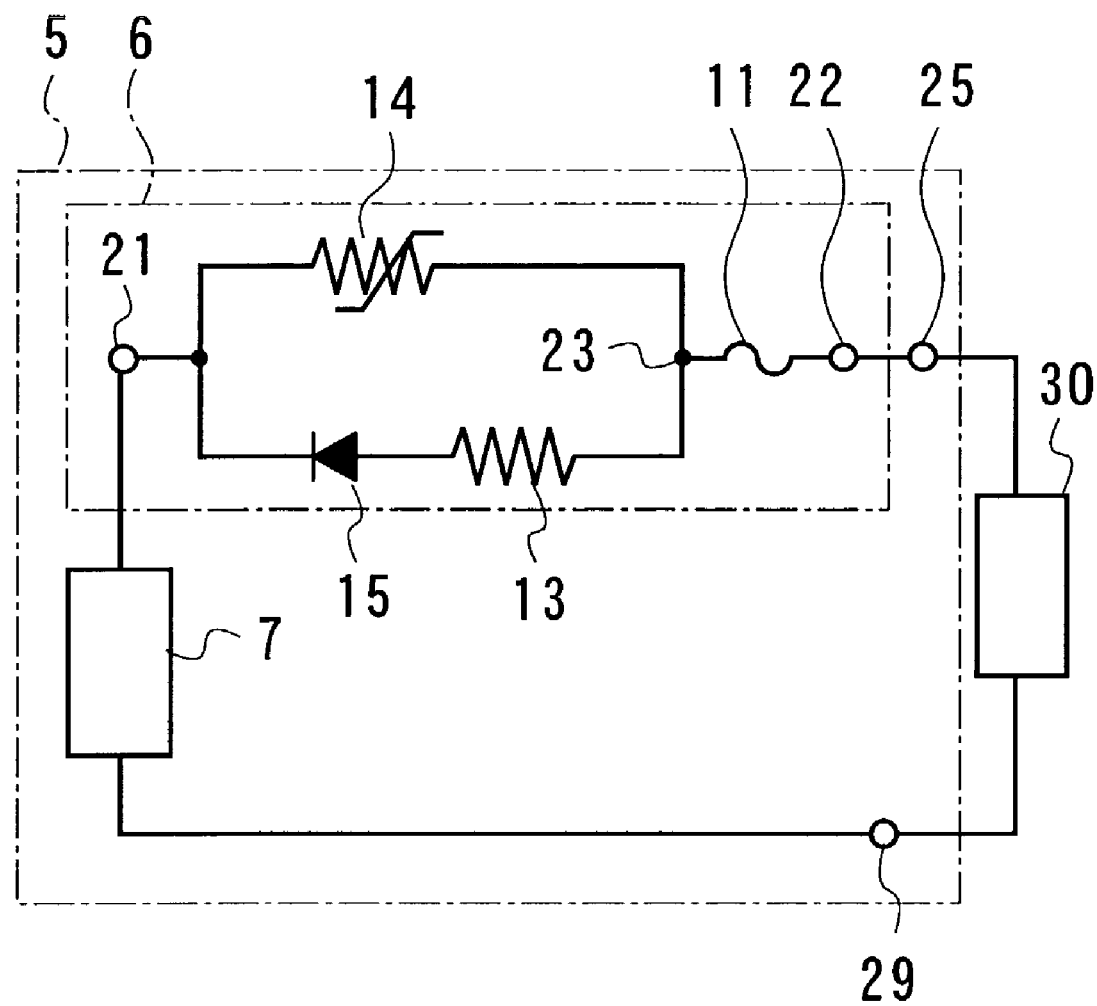
FIG. 1 shows a block diagram for illustrating a secondary battery in accordance with one embodiment of the present invention.

Reference 5 in FIG. 1 represents an example of a secondary battery in accordance with one embodiment of the present invention. The secondary battery comprises a protective circuit 6, an accumulator 7, an external connection terminal 25 and a grounding terminal 29.

Protective circuit 6 includes an internal input/output terminal 21, an external input/output terminal 22, a fuse 11, a heater 13, a thermistor 14 and a diode 15. Diode 15 has an anode terminal connected to one end of heater 13 and a cathode terminal connected to internal input/output terminal 21. The other end of heater 13 is connected to one end of fuse 11, and the other end of fuse 11 is connected to external input/output terminal 22.

One end of the thermistor 14 is connected to the connection between fuse 11 and heater 13, while the other end is connected to internal input/output terminal 21. Thus, thermistor 14 is connected in parallel with a series circuit comprising heater 13 and diode 15. Reference 23 represents the connection between fuse 11 and heater 13, which corresponds to an intermediate electrode layer described later.

In this embodiment, accumulator 7 is a secondary battery such as a lithium-ion battery or a nickel-hydrogen battery having a high voltage side terminal connected to internal input/output terminal 21. However, while reference is made to a particular type, one of ordinary skill in the art would recognize that other structures/types of accumulators may be used without departing from the scope of the present invention.

Protective circuit 6 is fixed to accumulator 7 and housed in the same case. External connection terminal 25 and grounding terminal 29 are electric contact members drawn outside the case, and external connection terminal 25 is connected to external input/output terminal 22 of protective circuit 6.

Grounding terminal 29 is connected to a terminal of accumulator 7 on the low voltage side, so that a DC voltage source is connected between external connection terminal 25 and grounding terminal 29 to charge secondary battery 5 during charging, while the battery is attached to a load 30 such as a notebook computer to supply electric power to load 30 during service by connecting terminals of load 30 to external connection terminal 25 and grounding terminal 29.

Again, while reference is made to a particular load (e.g., a notebook computer) no limitation is intended.

Figure 2A:
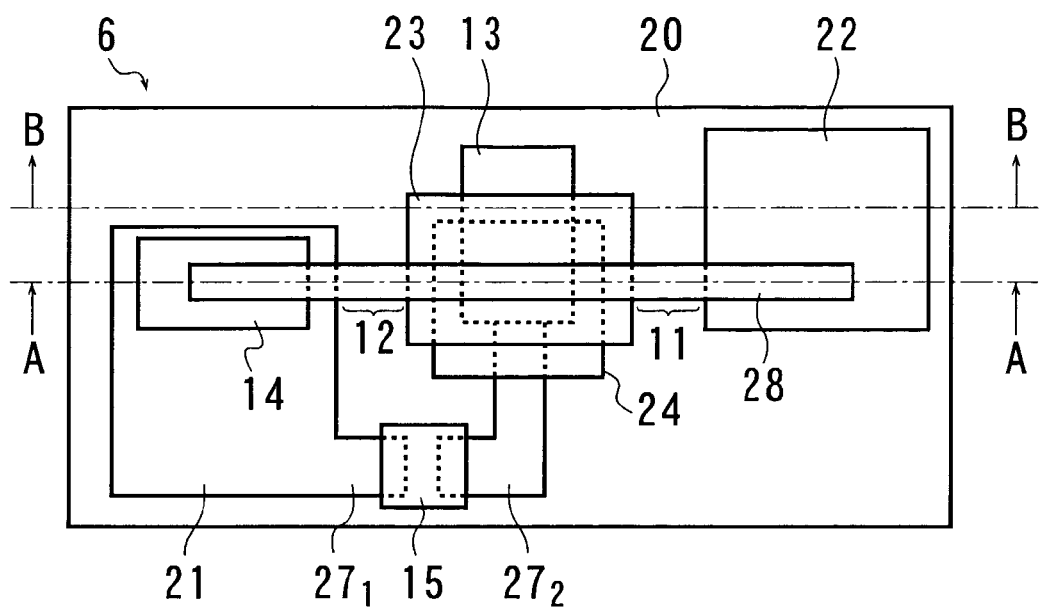
FIG. 2(a) shows a plan view of the secondary battery in accordance with one embodiment of the present invention, (b) is a sectional view taken along line A—A in (a), and (c) is a sectional view taken along line B—B in (a).

Next, the inner structure of protective circuit 6 is explained. FIG. 2(a) shows a plan view of one embodiment of a protective circuit 6, FIG. 2(b) is a sectional view taken along line A—A in FIG. 2(a), and FIG. 2(c) is a sectional view taken along line B—B in FIG. 2(a).

Figure 2B:
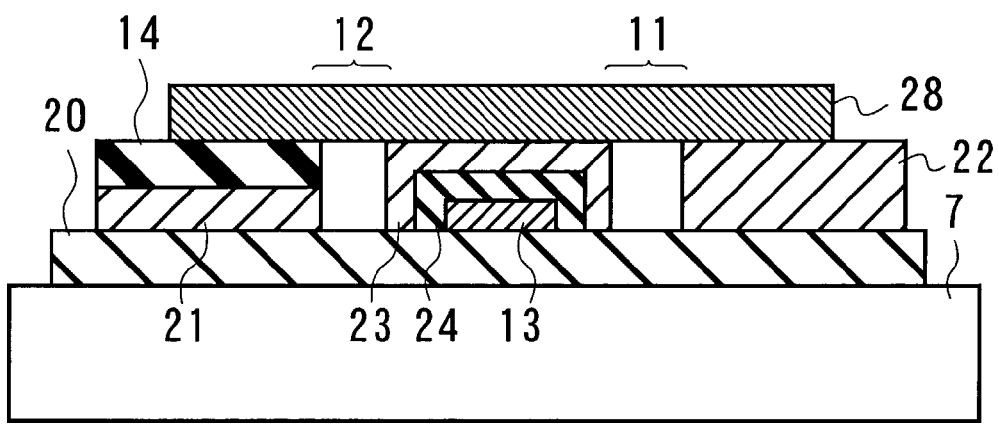
Figure 2C:
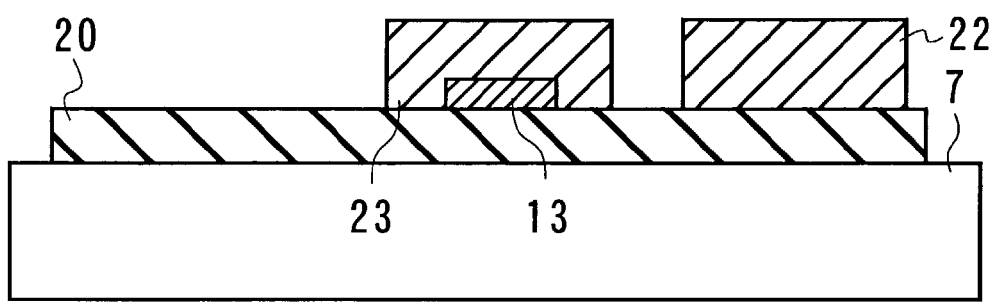
Figure 3:
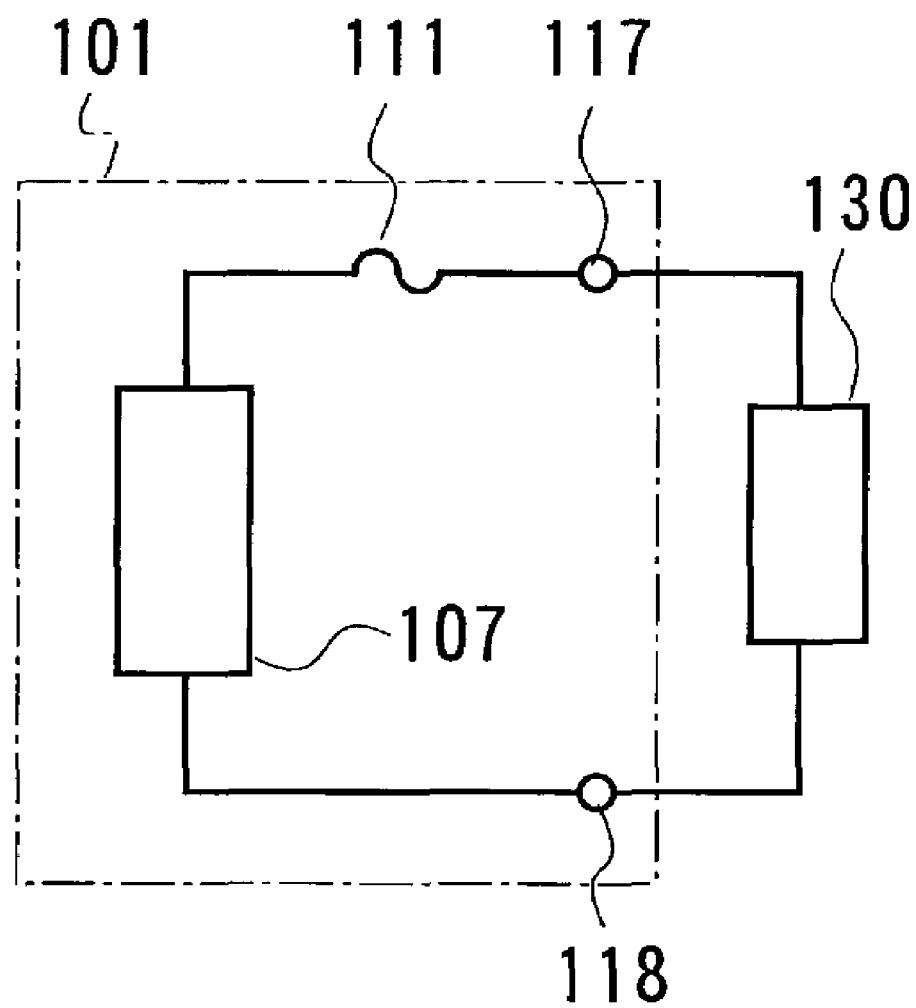
FIG. 3 shows a secondary battery of the prior art.

Referring to FIGS. 2(a)–(c), protective circuit 6 comprises an insulating substrate 20 made of alumina having a thickness of about 0.5 mm. The bottom surface of the insulating substrate 20 is bonded to accumulator 7 with an adhesive, while the top surface of insulating substrate 20 has a silver paste (sold under the name "QS174" available from DuPont) and a ruthenium oxide-based resistive paste (sold under the name "DP1900" available from DuPont) applied in a predetermined pattern and baked at 870° C. for 30 minutes to form internal input/output terminal 21, external input/output terminal 22 and two lines $27_1$, $27_2$ with the silver paste and heater 13 with the resistive paste.

Of the two lines $27_1$, $27_2$, one line $27_1$ is connected to internal input/output terminal 21 and the other line $27_2$ is connected to heater 13. Internal input/output terminal 21 and external input/output terminal 22 or two lines $27_1$, $27_2$ are isolated from each other.

Then, a silica-based insulating paste (sold under the name AP5364 available from DuPont) was applied on the surface of heater 13 and baked at 500° C. for 30 minutes to form an insulating layer 24. This insulating layer 24 covers the connection between heater 13 and line $27_2$. The surface of heater 13 is exposed except for the part of the surface covered by the insulating layer 24, when the inslating layer 24 is formed.

Then, in this embodiment, the same silver paste as used to form lines $27_1$, $27_2$ and other members described above is applied on the surface of the insulating layer 24 and the exposed surface of heater 13 and baked to form an intermediate electrode layer 23. Baking conditions involved the same temperature and period as used to form lines $27_1$, $27_2$ and other members. Again, while reference has been made to various chemicals and process conditions, the invention is not limited to those described above. One of ordinary skill, having the benefit of this disclosure, would recognize numerous alternatives. Moreover, while a particular embodiment discloses using the same paste throughout, different pastes may be used, alone or in combination.

The intermediate electrode layer 23 is electrically connected to heater 13 on the surface of heater 13. Then, thermistor 14, which is preliminarily prepared by the process described in one embodiment below, is mounted on an end of internal input/output terminal 21.

One process for preparing thermistor 14 is explained. In this embodiment, fifty-seven parts by volume of a polyethylene (available from Japan Polychem Corporation sold under the name LC500), 3 parts by volume of an ethylene-ethyl acrylate copolymer (EEA: available from Nippon Unicar Co., Ltd. sold under the name NUC6170) and 40 parts by volume of conductive particles (electrolessly plated graphite particles available from Nippon Carbon under trade name PC1020) were kneaded at 160° C. using a kneader, and then hot pressed between sheets of an electrolytic nickel foil having a thickness of 35 μm (available from FUKUDA METAL FOIL & POWDER Co., Ltd.) at 160° C. under 5 kg/cm² for 60 seconds to give a thermistor pre-cut substrate having a thickness of 400 μm.

The thermistor pre-cut substrate was then cut into a size of 2 mm×2 mm to give thermistor 14. The electrolytic nickel foils sandwiching the thermistor were used as electrodes. A lower electrode was electrically connected to internal input/output terminal 21. Then, a sheet of low-melting metal foil 28 was connected to the surface of intermediate electrode layer 23 at the center, to an upper electrode of thermistor 14 at one end and to the surface of external input/output terminal 22 at the other end, so that thermistor 14 was electrically connected to intermediate electrode layer 23 and this intermediate electrode layer 23 is electrically connected to external input/output terminal 22 via low-melting metal foil 28.

In this embodiment, low-melting metal foil 28 comprises lead, tin, antimony or an alloy thereof having the property of fusing at low temperature. Low-melting metal foil 28 forms fuse 11 at the part between external input/output terminal 22 and intermediate electrode layer 23. Another fuse 12 is formed at the part between thermistor 14 and intermediate electrode layer 23, but the latter fuse is not disconnected because it is connected in series with thermistor 14. Therefore, this fuse is not shown in the circuit diagram of FIG. 1.

Finally, diode 15 is placed to pass two lines $27_1$, $27_2$ so that the anode electrode of diode 15 is connected to line $27_2$ on the side of heater 13 and the cathode electrode is connected to line $27_1$ on the side of internal input/output terminal 21 to obtain a protective circuit 6.

The resistance value of thermistor 14 is about 20 mΩ at normal temperature and increases to about 5 Ω at 90° C. The resistance value of heater 13 is about 1 Ω Notably, temperature variations have little effect on the heater.

When external connection terminal 25 and grounding terminal 29 of this secondary battery 5 are connected to an external DC voltage source in place of load 30 to charge accumulator 7, diode 15 is forward-biased but the current supplied from the DC voltage source passes through thermistor 14 into accumulator 7 via internal input/output terminal 21 because the resistance of thermistor 14 is lower than that of a series circuit consisting of heater 13 and diode 15, and accumulator 7 is charged.

If the output voltage of the external DC voltage source has a specified value, no more current flows and charging is terminated once the voltage of accumulator 7 rises to a level comparable to the output voltage of the external DC voltage source.

If the output voltage of the external DC voltage source has a superspecified value, accumulator 7 becomes overcharged and the voltage of accumulator 7 rises beyond the specified value.

Protective circuit 6 and accumulator 7 are fixed each other, and a thermal conductivity between protective circuit 6 and accumulator 7 is made high. When accumulator 7 is charged over a specified voltage and heats up, thermistor 14 heats up to the same temperature as that of accumulator 7.

The resistance value of this thermistor 14 is selected to increase to about 5 Ω at 90° C., and the resistance value of thermistor 14 is higher than the resistance value of a series circuit comprising of diode 15 and heater 13 in an overcharged condition.

Thus, the current supplied from the external DC voltage source passes through heater 13 and diode 15 in an overcharged condition so that heater 13 generates heat by the current passes through it. The heat generated in heater 13 is transferred to low-melting metal foil 28 via internal electrode layer 23 with the result that fuse 11 formed of a part of low-melting metal foil 28 breaks to open the connection between external input/output terminal 22 and intermediate electrode layer 23, thereby shutting off the current flowing to accumulator 7.

Even when the overcharged condition is dissolved, fuse 11 does not recover from breaking in this case and overcharged accumulator 7 is separated from external connection terminal 25 to ensure safety.

If external connection terminal 25 and grounding terminal 29 are short-circuited by accident while accumulator 7 is charged, however, diode 15 is reverse-biased and a short-circuit current passes through thermistor 14 and not heater 13. The thermistor 14 spontaneously heats up by the short-circuit current and the current decreases once the resistance value increases beyond 5 Ω.

In this case, fuse 11 does not break and the whole of secondary battery 5 returns the state that before short-circuit is caused when the short-circuit condition is dissolved.

Although a tin/antimony alloy was used for low-melting metal foil 28 in the example above, the present invention is not limited thereto. For example, low-melting metals such as a bismuth/tin/lead alloy (Bi:Sn:Pb=52.5:32.0:15.5, melting point 95° C.) or a tin/silver alloy (Sn:Ag=97.5:2.5, melting point 226° C.) can be used.

Protecting secondary battery against both overcurrent and overcharging can be ensured with a limited number of components.

The fuse breaks and the accumulator is separated from the external connection terminal in the case of overcharging, while the fuse does not break in the case of short circuit and returns the state that before short-circuit is caused when the short-circuit condition is dissolved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A secondary battery comprising:
a rechargeable/redischargeable accumulator; and
a protective circuit connected to the accumulator wherein charging/discharging current of the accumulator flows through the protective circuit, the protective circuit comprising:
a heater;
a diode connected in series with the heater to form a diode-heater series circuit, the diode being forward-biased when a charging current is supplied from an external DC voltage source to the accumulator;
a thermistor connected in parallel with the diode-heater series circuit, the thermistor having a resistance value increasing with temperature rise; and
a fuse connected in series with a parallel circuit comprising the diode-heater series circuit and the thermistor, the fuse is adapted to break based on a selected amount of heat generated by the heater,
wherein a resistance value of the heater is higher than that of the thermistor at normal temperature, and
wherein the resistance value of the thermistor becomes higher than that of the heater when the thermistor is heated by the accumulator, which warms up under an overcharged condition, thereby a current flows through the heater via the diode to generate heat.

2. The secondary battery of claim 1 wherein the protective circuit is attached to the accumulator, and the thermistor is heated up by the accumulator heating.

3. A secondary battery, comprising:
an external connection terminal;
a ground terminal;
a rechargeable/redischargeable accumulator; and
a protective circuit connected to the accumulator such that charging/discharging current of the accumulator flows through the protective circuit,
wherein the protective circuit comprises:
a heater;
a diode connected in series with the heater to form a diode-heater series circuit, the diode being forward-biased when a charging current is supplied from an external DC voltage source to the accumulator;
a thermistor connected in parallel with the diode-heater series circuit, the thermistor having a resistance value increasing with temperature rise; and
a fuse connected in series with a parallel circuit comprising the diode-heater series circuit and the thermistor, the fuse is adapted to break based on a selected amount of heat generated by the heater,
wherein a resistance value of the heater is higher than that of the thermistor at normal temperature, and
wherein the resistance value of the thermistor becomes higher than that of the heater when the thermistor is heated by the accumulator, which warms up under an overcharged condition, thereby a current flows through the heater via the diode to generate heat,
wherein, when the external connection terminal and the ground terminal are short-circuited, the diode becomes reverse-biased by charged voltage, and the resistance value of the thermistor is increased by heat generated by the current flowing through the thermistor.

* * * * *